United States Patent
Tione

(10) Patent No.: US 7,413,265 B2
(45) Date of Patent: Aug. 19, 2008

(54) BRAKING CONTROL SYSTEM FOR A RAILWAY OR TRAMWAY VEHICLE WITH INTEGRATED ANTI-SLIP AND ANTI-LOCK FUNCTIONS FOR THE WHEELS

(75) Inventor: Roberto Tione, Lauriano (IT)

(73) Assignee: Faiveley Transport Piossasco S.p.A., Torino (IT)

( * ) Notice: Subject to any disclaimer, the term of this patent is extended or adjusted under 35 U.S.C. 154(b) by 53 days.

(21) Appl. No.: 11/080,499

(22) Filed: Mar. 16, 2005

(65) Prior Publication Data

US 2005/0212354 A1 Sep. 29, 2005

(30) Foreign Application Priority Data

Mar. 17, 2004 (IT) ............................ TO2004A0179

(51) Int. Cl.
*B60T 8/88* (2006.01)
(52) U.S. Cl. .................... 303/122.04; 303/128; 303/133
(58) Field of Classification Search ............ 303/122.06, 303/122.07, 122.08, 123, 127, 128, 133
See application file for complete search history.

(56) References Cited

U.S. PATENT DOCUMENTS

| | | | | |
|---|---|---|---|---|
| 4,085,979 | A | * | 4/1978 | Leiber et al. ............ 303/122.08 |
| 4,400,792 | A | * | 8/1983 | Strelow ........................ 714/11 |
| 4,457,237 | A | | 7/1984 | Theurer et al. |
| 5,001,641 | A | * | 3/1991 | Makino ........................ 701/76 |
| 5,548,601 | A | * | 8/1996 | Kato et al. .................... 714/820 |
| 5,718,486 | A | * | 2/1998 | Vollmer et al. ................. 303/3 |
| 6,173,229 | B1 | * | 1/2001 | Fennel et al. ................. 701/91 |
| 6,209,966 | B1 | * | 4/2001 | Mies ............................. 303/3 |

FOREIGN PATENT DOCUMENTS

DE 4227084 A1 2/1994

\* cited by examiner

*Primary Examiner*—Xuan Lan Nguyen
(74) *Attorney, Agent, or Firm*—Sughrue Mion, PLLC

(57) ABSTRACT

A system that performs anti-slip and anti-lock functions of the wheels in a vehicle provided with a pneumatic braking system. The system includes a brake control apparatus to which is connectable a plurality of electro-pneumatic valve units for control of the brake cylinders associated with the wheels/axles. These valve units are controlled in such a way as selectively to permit application of a braking pressure to the associated brake cylinders, holding this pressure, and discharge of the pressure from the brake cylinders.

3 Claims, 2 Drawing Sheets

BRAKING CONTROL SYSTEM FOR A RAILWAY OR TRAMWAY VEHICLE WITH INTEGRATED ANTI-SLIP AND ANTI-LOCK FUNCTIONS FOR THE WHEELS

BACKGROUND OF THE INVENTION

The present invention relates to a braking control system for a railway or tramway vehicle.

More specifically, the subject of the invention is a braking control system with anti-slip and anti-lock functions for the wheels for a railway or tramway vehicle provided with a pneumatic braking system including brake control apparatus to which a plurality of electro-pneumatic valve units are connectable for control of the brake cylinders associated with the wheels/axles of the vehicle; the said valve units being controllable in such a way as to allow selective application of a braking pressure to the associated brake cylinders, holding this pressure, and discharge of the pressure from the said brake cylinders.

SUMMARY OF THE INVENTION

One object of the present invention is to provide a control system of the above-specified type which has an efficient integration between the anti-slip function and the anti-lock function, for a greater operating safety of the railway or tramway vehicle/train and for a more effective protection of the wheels thereof.

This and other objects are achieved according to the invention with a control system of the type specified above, characterised in that each axis of the vehicle is associated with at least first and second respective independent angular velocity sensors;
the said electro-pnuematic valve units include respective redundant solenoid control valves with independent first and second control input units; and
the control means comprise
first and second independent electronic control units connected respectively to the first and second speed sensors of each axle, as well as, respectively, to the first and second control input units of the said valve units, and arranged to transmit from one to the other a respective state signal or vital signal indicative of its operating condition;
the first unit being arranged to perform a wheel anti-slip procedure;
the second unit being arranged to perform a wheel anti-lock procedure when the state signal transmitted to it from the first unit indicates that this latter is functioning normally, and to perform both the anti-slip and the anti-lock procedures when the state signal transmitted to it from the first unit is indicative of a malfunction or breakdown condition of this latter.

BRIEF DESCRIPTION OF THE DRAWINGS

Further characteristics and advantages of the invention will become apparent from the following detailed description, given purely by way of non-limitative example, with reference to the attached drawings, in which.

DETAILED DESCRIPTION OF THE INVENTION

Figure 1:
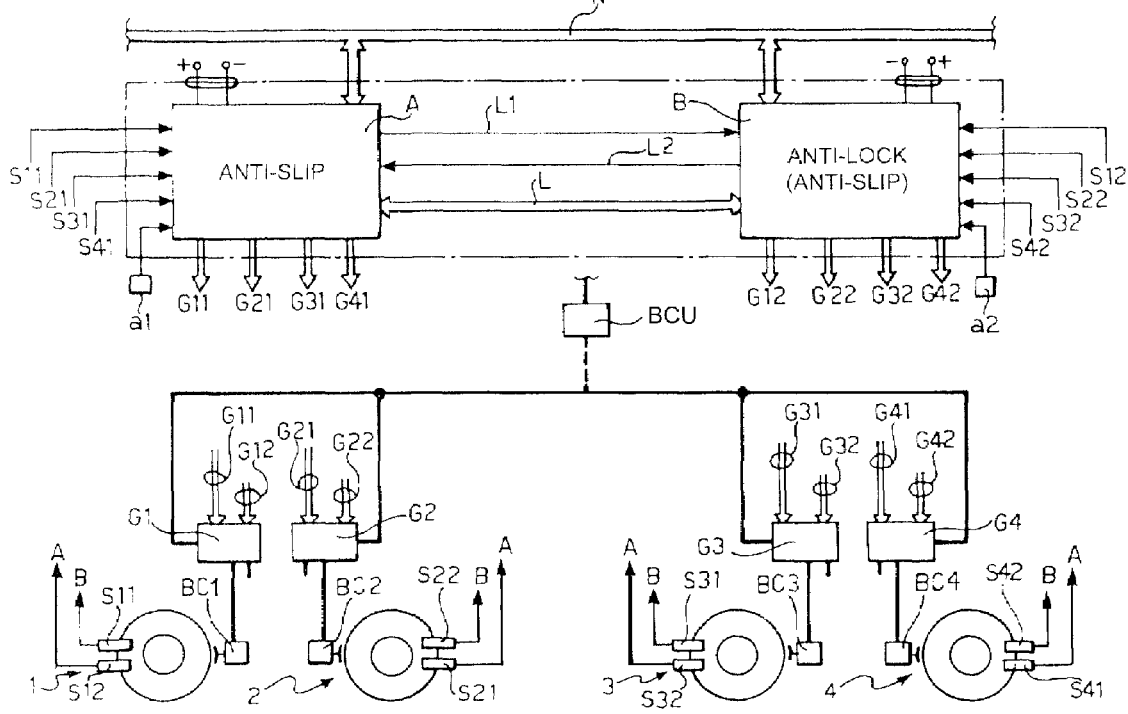
FIG. 1 is a partial block diagram of a control system according to the present invention.

In FIG. 1 there is shown a braking control system with anti-slip and anti-lock functions for the wheels of a railway or tramway vehicle provided with a pneumatic braking system which, in a manner known per se, includes braking control means BCU to which are coupled electro-pneumatic control units G1-G4, for example by means of a control distributor.

In the exemplary embodiment illustrated the railway or tramway vehicle has four axles, indicated with numbers from 1 to 4, and each axle is associated with a corresponding electro-pneumatic valve unit G1 to G4. The invention is not, however, limited to the schematically illustrated embodiment which is exemplary only.

The valve units G1-G4 control respective brake cylinders BC1-BC4 associated with the wheels/axles of the vehicle. In particular, as will become more clearly apparent hereinbelow, each valve unit G1-G4 is formed in such a way that it can be controlled so as to permit the selective application of a braking pressure to the associated brake cylinders, to hold this pressure, and to discharge this pressure from the said brake cylinders.

Each axle 1-4 of the vehicle is associated with respectively first and second independent angular speed sensors. In FIG. 1 the sensors associated with the axle 1 have been indicate S11 and S12, the sensors associated with axle 2 have been indicated S21 and S22, the sensors associated with axle 3 have been indicated S31 and S32, and finally the sensors associated with axle 4 have been indicated S41 and S42.

Figure 2:
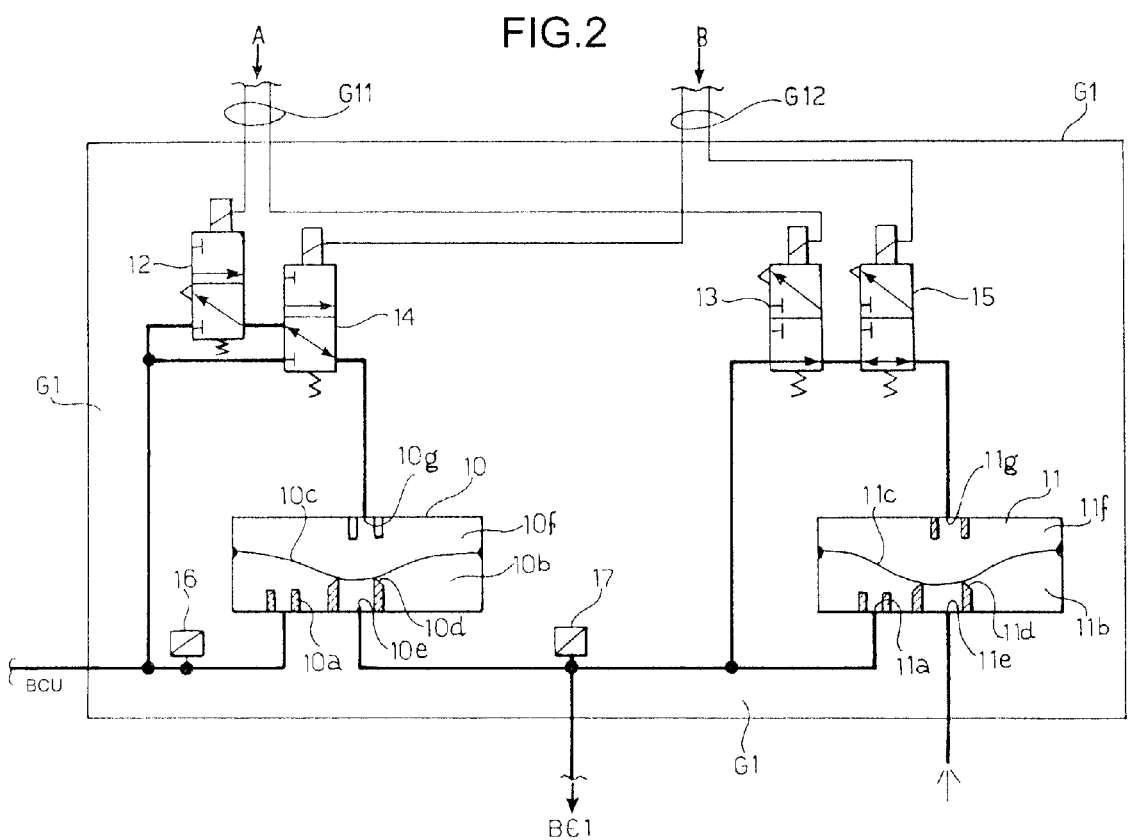
FIG. 2 is a partial diagram which shows the structure of a possible embodiment of an electro-pneumatic valve unit associated with one axle in a control system according to the present invention.

As will appear more clearly from the following description with particular reference to FIG. 2, each electro-pneumatic valve unit G1-G4 comprises respective redundant solenoid control valves with first and second independent control inlet units indicated G11, G12, G21, G22, G31, G32 and G41, G42.

The control system further includes two independent electronic control units, indicated A and B respectively.

These control units A and B are connected respectively to the first and second speed sensors of the axles 1-4, as well as to the first and second control inlet units respectively of the valve units G1-G4, as indicated by the arrows in FIG. 1.

The control unit A is arranged to perform an anti-slip procedure on the wheels of the vehicle, for example in conformity with the prescriptions of regulation UIC 541-05.

The electronic control unit B on the other hand is arranged to perform an anti-lock procedure on the wheels, or a simultaneous anti-lock and anti-slip procedure.

The units A and B are however totally independent of one another and are isolated even as far as their electrical supply is concerned; they are conveniently provided with their own independent electricity supply so that a breakdown of the electrical supply device associated with one unit will not be able to compromise the functionality of the other control unit.

Each electrical supply device can in turn be connected to the on-board electricity supply (for example a battery) via an independent connector.

The control units or modules A and B are arranged to transmit to one another (reciprocally) a respective state signal or "vital" signal indicative of its operating condition. This can take place, for example, via two unidirectional communication lines such as those indicated L1 and L2, and/or via a single bidirectional line such as that indicated L in FIG. 1.

Each state signal can be a signal which has a first state (the presence of a pre-determined frequency) when the control unit A or B which emits it wishes to signal its correct functioning condition to the unit which receives it, and a second state (for example absence of a pre-determined frequency) for indicating its malfunction or breakdown condition and the changeover or conversion to inoperativity.

In operation, when both the control units A and B function correctly the unit A performs, when necessary, the wheel anti-slip procedure, whilst the unit B—when necessary—performs the anti-lock procedure.

The second control unit B is, however, arranged to perform both the wheel anti-lock procedure and the anti-slip procedure when the state signal transmitted to it by the first unit A becomes indicative of a malfunction or breakdown condition of this latter.

If the anti-slip control procedures are performed by means of software it is suitable that the software which implements these procedures in the unit A and in the unit B respectively are different from one another.

The control units A and B can conveniently be interfaced to a common communications network N through which they can communicate with one another and with other similar devices (not shown) for the exchange of data concerning the absolute speed of the respective axles, for the purpose of being able to determine the optimum "reference speed" necessary for the efficient estimation of the reference speed of the vehicle.

The control unit A can indicate, via the same communications network N, a malfunction or breakdown condition of itself or of the unit B to monitoring and diagnostic devices and/or to man/machine interfaces (known per se and not illustrated).

The control units A and B may conveniently be interfaced to respective accelerometers a1 and a2 intended to detect the longitudinal acceleration of the vehicle. By integrating the longitudinal accelerations over time these units can determine the instantaneous longitudinal speed of the vehicle, at least below a certain constant value. This constant can be periodically corrected (for example every second) by each control unit, thanks to information relating to the absolute speed of the local axles, by utilising suitable algorithms (for example when the two axles have an identical longitudinal speed value for a time interval of pre-determined duration). The longitudinal speed value obtained by integrating the data provided by the accelerometers can be utilised as the reference speed for the vehicle whenever the speeds of the two axles diverge (negative values) with respect to the reference speed to such an extent as to be indicative of a slip condition of the axles.

In FIG. 2 there is shown an embodiment of the valve unit G1 (the other units G2-G4 of FIG. 1 have an analogous structure).

In the embodiment of FIG. 2, the valve unit of G1 comprises two pneumatically controlled pneumatic valves 10, 11.

The pneumatic valve 10 has an inlet 10a through which the pressure coming from the brake control means BCU can be introduced into a lower chamber 10b beneath a membrane 10c capable of cooperating in the manner of a valve shutter, with a valve seat 10d of the outlet 10e of this valve. The chamber 10f above the membrane is capable of receiving a pneumatic control pressure through a control inlet 10g.

The valve 11 is structurally identical to the valve 10 and its parts have been indicated with the number 11 followed by the same letters utilised above to distinguish the parts of the valve 10.

The inlet 10a of the valve 10 receives, in operation, a pressure coming from the brake control means BCU and intended for the brake cylinder BC1 of the axle 1. The pressure at the inlet 10a of the valve 10 may or may not lead to the brake cylinder BC1 depending on the position assumed by the membrane 10c which is controlled by the pneumatic pressure in the upper chamber 10f.

Associated with the valve 10 are two structurally identical solenoid control valves indicated 12 and 14, controlled by the unit A and the unit B respectively. In the embodiment illustrated the solenoid vales are two-way two-position valves with a return spring.

In the de-excited condition of these valves (illustrated in FIG. 2) the chamber 10f of the valve 10 is connected to the atmosphere through the two solenoid valves 14 and 12. The braking pressure which arrives at the inlet 10a is now capable of displacing the membrane 10c upwardly and, via the seat 10d and the outlet 10e can reach the brake cylinder BC1.

When one or the other of the solenoid valves 12 and 14 is excited, the pressure which arrives at the inlet of the valve unit G1 and at the inlet 10a of the valve 10 is also introduced into the upper chamber 10f above the membrane 10c. This membrane, pressed against the seat 10d, blocks the passage of air under pressure from the chamber 10b to the brake cylinder BC1.

The pneumatic valve 11 has its inlet 11a connected to the brake cylinder BC1 and to the outlet 10e of the valve 10. The outlet 11e of the valve 11 is a discharge-to-atmosphere outlet.

Between the inlet 11a for air under pressure and the control inlet 11g of the valve 11 are disposed, in series, two solenoid control valves 13 and 15 also of the two-way two-position type, with return spring, one controlled by the unit A and the other by the unit B. The arrangement is such that when these solenoid valves 13 and 15 are both de-excited (FIG. 2) they deliver to the chamber 11f above the membrane 11c a pressure such as to maintain this membrane against the seat 11d. In this condition the outlet 11e of the valve 11 is decoupled from the inlet 11a.

On the other hand, when one or the other of the solenoid valves 13 and 15 is excited the chamber 11f is put into communication with the atmosphere, and the pressure supplied to the lower chamber 11b beneath the membrane 11c is such as to cause the separation of this latter form the seat 11d so that this chamber 11b is put into communication with the atmosphere through the outlet 11e. In this condition the pressure in the brake cylinder BC1 can be discharged to atmosphere through the valve 11.

Two electric pressure transducers 16 and 17 are conveniently disposed in such a way as to detect the pressure at the inlet 10a of the pneumatic valve 10 and, respectively, between the outlet 10e of the valve 10 and the inlet 11a of the valve 11 (or rather the pressure in the brake cylinder BC1).

Naturally, the principle of the invention remaining the same, the embodiments and details of construction can be widely varied with respect to what has been described and illustrated purely by way of non-limitative example, without by this departing from the ambit of the invention as defined in the annexed claims.

What is claimed is:

1. A braking control system with anti-slip and anti-lock functions for the wheels, for a railway or tramway vehicle provided with a pneumatic braking system including brake control apparatus connected to a plurality of electro-pneumatic valve units, each controlling brake cylinders associated with a respective axle of the vehicle; said valve units being controlled by control means to apply a braking pressure to the associated brake cylinders, to hold the braking pressure, or to release the pressure of said cylinders;

each axle of the vehicle having associated therewith one first and, respectively, one second angular speed sensor, independent from one another sensing the speed of a same rotating portion of the axle;

the said electro-pneumatic valve units including respective first and second solenoid control valves with first and second independent control inlets; and the control means comprising first and second independent electronic control units, connected to the respective first and second speed sensors of each axle and to the respective first and second control inlet unit of the said valve units, and predisposed to transmit from one to the other a respective state signal or vital signal indicative of its operating condition of the control unit;

the first control unit being arranged to initially perform only a wheel anti-slip procedure;

the second control unit being arranged to perform only a wheel anti-lock procedure when the state signal transmitted to the second control unit from the first control unit indicates that first control unit is functioning normally, and to perform both the wheel anti-lock procedure and an anti-slip procedure when the state signal transmitted to the second control unit from the first control unit is indicative of a malfunction or breakdown condition of the first control unit.

2. A system according to claim 1, in which each valve unit comprises a first pneumatically controlled pneumatic valve or pressure valve block disposed between the said brake control apparatus and at least one associated brake cylinder and a second pneumatically controlled pneumatic valve or discharge valve connected to the said brake cylinder and the outlet of which is able to discharge to atmosphere, each of the said pneumatic valves being associated with the respective first and second control solenoid valves controlled by the first and second electronic control units respectively.

3. A system according to claim 2, in which the said first and second control solenoid valves are of the two-way, two-position type.

* * * * *